Patented Oct. 20, 1936

2,058,315

UNITED STATES PATENT OFFICE 2,058,315

ORGANIC PERSULPHONIC COMPOUNDS AND PROCESS OF PREPARING SAME

Richard Huttenlocher and Wilhelm Lamatsch, Oberlahnstein-on-the-Rhine, Germany, assignors to Buffalo Electro Chemical Co. Incorporated, Buffalo, N. Y.

No Drawing. Application November 10, 1931, Serial No. 574,218. In Germany November 14, 1930

9 Claims. (Cl. 260—16)

The present invention relates to a process for the preparation of organic persulphonic acid compounds, more particularly compounds of the type R—SO$_2$—O—O—Me where R represents an aliphatic, aromatic, hydro-aromatic or hetero-cyclic organic radical.

Persulphuric acid and salts thereof have been known for a considerable length of time and the properties of these compounds studied and published. Persulphuric acid itself is not stable but salts of persulphuric acid have found use for certain industrial purposes.

The preparation of the compounds to which the present invention relates, that is, the persulphonates may be undertaken by reacting an aliphatic, aromatic, hydro-aromatic or hetero-cyclic sulpho-compound with a peroxide. In accordance with the methods of the present invention the preparation of the following persulphonic acid derivatives has proved successful:

(a) A reaction between the sulpho chloride of an aliphatic, aromatic, hydro-aromatic or heterocyclic sulphonic acid and a peroxide.

(b) By converting the free organic sulphonic acid to the persulphonic compound by reaction with peroxide.

(c) By a reaction between hydrogen peroxide and sulpho-compounds R—SO$_2$—O—X where R possesses its usual significance and designates any organic radical such as an aliphatic, aromatic, hydro-aromatic or hetero-cyclic fragment and X represents a usual metal derivative, as for instance, a sodium or potassium salt.

(d) It has also been found that peroxides of the type of organic sulpho compounds such as R—SO$_2$—O—O—SO$_2$—R or R—SO$_2$—O—O—SO$_2$—R', may be changed in accordance with the methods of the present invention to persulphonic compounds by the use of peroxide.

Stabilization of the organic persulphonic compounds produced in accordance with the methods of the present invention is effected by the use of stabilizers of the same character as those currently used for hydrogen peroxide and for peroxide and per-salts generally. These stabilizers can be added to the original material, either during the reaction, or can be mixed with the final end product.

The preparation of the persulphonic compounds will be more fully explained by the following examples, although it will be remembered that the reaction upon the sulpho group is a general one and can be used generally upon the classes of compound indicated and is not restricted to the examples set forth herein.

*Example 1.*—To a suspension of 80 grams of sodium peroxide and 100 grams of ethyl-alcohol, 190 grams of toluol-sulphochloride dissolved in the same quantity of benzol is added with intensive cooling with the use of brine solution where necessary. It is important that the reaction be carried out at low temperatures, otherwise the reaction is violent and the chemical products may be burnt. After the reaction components have been mixed the temperature should be slowly raised to about 10° C., and kept at this point for a sufficient time to permit the conversion of the whole of the sodium peroxide to the flaky sodium salt of toluol-persulphonic acid. The solvent is thereafter separated from the white salt which is soluble in water. By working according to the above process an output of about 85% of theory is obtained with the preparation of a product containing about 6½% active oxygen. Toluol-persulphonic acid sodium salt, if mixed with stabilizers and stored in a dry place is not decomposed for a considerable length of time.

*Example 2.*—Mix 416 grams naphthalene sulphonic acid with an aqueous solution of 23 grams sodium pyrophosphate. Add 90 grams of sodium peroxide and 100 grams of hydrogen peroxide of 35% by weight to this suspension under cooling conditions. After the reaction is complete the mixture is evaporated to dryness under a vacuum with the formation of a white powder of sodium salt of naphthalene persulphonic acid containing about 6% of active oxygen.

*Example 3.*—A mixture of 20 grams of sodium pyrophosphate dissolved in 100 grams of hydrogen peroxide of 70% hydrogen peroxide by weight is mixed with 332 grams of naphthalene-di-sulphonic-acid-sodium salt. The reaction mixture is heated and the resultant product dried in vacuum. The product contains 7.6% of active oxygen.

*Example 4.*—To an ice cooled aqueous solution of 30 grams of sodium-pyrophosphate and 90 grams of sodium peroxide, 500 grams of di-isopropyl B-naphthalene-sulpho-acid-peroxide is added and the reaction permitted to go to completion whereupon the produce is dried in a vacuum. The yellowish reaction produce is soluble in water and contains about 5% active oxygen.

*Example 5.*—160 kg. of sodium peroxide and 740 kg. stearic acid sulphochloride are mixed under thorough cooling of the reaction vessel to produce the sodium salt of stearic acid persulphonic acid and sodium chloride.

The persulphonic compounds which are obtained in accordance with this invention are of very high industrial value. They are readily soluble in water and the aqueous solutions lose oxygen slowly even after standing for several days, more especially is this true if no oxidizable substances are present in the solution.

The organic persulphonic acids and their salts can be employed to advantage where it is important to develop active oxygen and to use it for oxidizing reactions. Thus, since the persulphonic compounds are stable even in alkaline solutions they are especially fitted as bleaching agents for animal, vegetable and artificial fibers of all kinds and can be employed generally for bleaching and disinfecting in the industrial arts. Persulphonic compounds can be used everywhere with advantage where it is important to have active oxygen in a stable form which can be administered in exact dosages. In addition, it has been found that the organic persulphonic compounds can be used to eradicate pernicious insects and the like.

What is claimed is:

1. A composition of matter consisting of an aryl persulphonic acid.

2. A composition of matter consisting of a metal salt of an aryl persulphonic acid.

3. The process of preparing persulphonic acid compounds which comprises reacting an aryl sulphonic acid metal salt with a peroxide selected from the group consisting of hydrogen peroxide and the alkali metal peroxides.

4. The process of preparing persulphonic acid compounds which comprises reacting an aryl sulphochloride with a peroxide selected from the group consisting of hydrogen peroxide and the alkali metal peroxides.

5. The process of preparing persulphonic acid compounds which comprises reacting an aryl sulphonic acid metal salt with a peroxide selected from the group consisting of hydrogen peroxide and the alkali metal peroxides.

6. The process of preparing persulphonic acid compounds which comprises reacting a material selected from the group consisting of aryl sulphonic acids, aryl sulphochlorides and aryl sulphonates with a peroxide selected from the group consisting of hydrogen peroxide and the alkali metal peroxides.

7. The process of preparing persulphonic acid compounds which comprises reacting an aryl sulpho peroxide with a peroxide selected from the group consisting of hydrogen peroxide and the alkali metal peroxides.

8. The process of preparing persulphonic acid compounds which comprises mixing a material selected from the group consisting of aryl sulphonic acids, aryl sulphonic acid metal salts, aryl sulpho chlorides, and aryl sulpho peroxides, with a material selected from the group consisting of hydrogen peroxide and the alkali metal peroxides, and cooling the reacting mixture during the mixing.

9. The process of preparing the sodium salt of toluene persulphonic acid which comprises mixing toluene sulphochloride with sodium peroxide and cooling the mixture during the mixing.

RICHARD HUTTENLOCHER.
WILHELM LAMATSCH.